Dec. 7, 1926.
P. BUNDY
WEED CUTTER
Filed Sept. 26, 1925
1,609,690
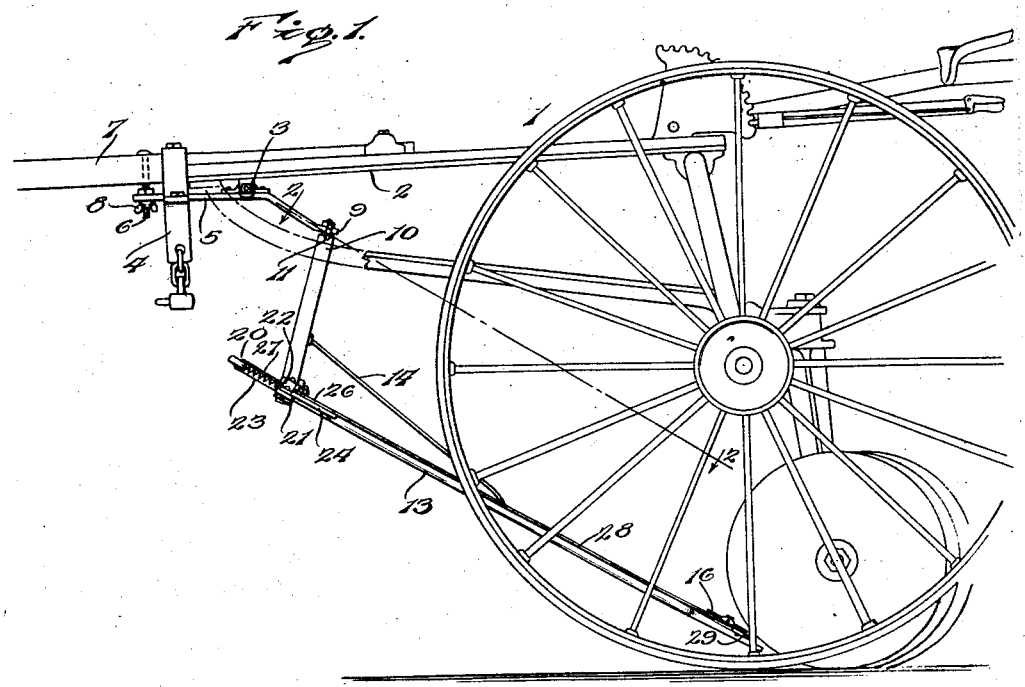
Inventor
P. Bundy
Lacey & Lacey, Attorneys Patented Dec. 7, 1926.

1,609,690

UNITED STATES PATENT OFFICE.

PHILANDER BUNDY, OF INDIANAPOLIS, INDIANA.

WEED CUTTER.

Application filed September 26, 1925. Serial No. 58,889.

This invention is an attachment for cultivators and has for its object the provision of inexpensive devices which may be readily mounted upon any cultivator and operate efficiently as the cultivator is drawn along a row of corn or another growing crop to cut the weeds which tend to hamper the growth of the crop. The invention seeks to provide knives mounted in such manner that they will not operate upon the corn stalks but will operate upon weeds which grow between the stalks and upon vines which tend to climb the stalks, and an object of the invention is to provide fingers or knife carriers which will operate automatically to yield to the corn stalks but will not be pushed aside by the weeds so that the latter will be destroyed. A further object of the invention is to provide means for mounting the attachment upon the cultivator which will permit it to be readily adjusted so that the knives will run at the desired height above the ground. Other objects will appear incidentally in the course of the following description, and the invention resides in certain novel features which will be hereinafter first fully described and then more particularly pointed out in the appended claims.

In the drawing:

Figure 1 is a side elevation of a portion of a cultivator with my attachment mounted thereon;

Fig. 2 is a plan view of the attachment with the support for the same in section on the line 2—2 of Fig. 1;

Fig. 3 is an enlarged detail sectional plan view of the rear ends of the fingers, and Fig. 4 is a plan view showing a modified form of the invention.

The cultivator, indicated at 1, may be of any well-known or preferred type. In carrying out my invention, I secure to the under side of the tongue of the cultivator a flat bar 2 which is provided with depending lugs or ears 3 in rear of the draft devices which are indicated at 4. Disposed between the lugs or ears 3 is a bar or strap 5 which is pivotally supported by the lugs, as shown in Fig. 1. Through the front end of the bar or metallic strap 5 is engaged a bolt 6 which is inserted through the cultivator tongue 7, and upon the lower end of this bolt is mounted a wing nut 8 whereby the strap or bar 5 may be pivotally adjusted and its rear end 9 set at any desired distance below the rear end of the cultivator tongue. The rear end 9 of this bar or strap 5 is bent downwardly, as shown clearly in Fig. 1, and to the extremity thereof is pivotally attached a U-shaped bar or yoke 10, a stop lug or stud 11 being provided upon the arch of this bar or yoke adjacent the pivot to impinge against the side of the holding bar 5 and thereby limit the pivotal movement of the yoke. It should be noted that while I have shown the yoke in a position closely approaching the vertical, it may be set in other inclinations according to the construction of the machine to which it is applied and other conditions, and frequently is arranged in a position closely approaching the horizontal. To the ends of the yoke 10, I secure the fingers 12 and 13 which converge downwardly and rearwardly from the yoke, as shown most clearly in Fig. 2, the fingers being adapted to run along the ground or near the surface thereof at opposite sides of the row of plants, as will be understood. One of the fingers, preferably the right-hand finger, 12, is attached rigidly to the end of the yoke or U-shaped bar 10 and is reinforced by a brace 14 extending between the finger and the yoke. Near the rear extremity of this finger 12, a ratchet-toothed wheel or link 15 is pivotally mounted thereon and carries a plurality of radial arms 16 adapted to project across the line of travel. A spring-pressed dog 17 is mounted on the finger 12 and engages the wheel to permit rotation of the same in one direction and prevent rotation in the opposite direction. When in the travel of the cultivator, an arm 16 strikes a stalk of corn, it will be swung rearwardly so that the corn will ride past it and another arm will be caused to extend across the space between the fingers 12 and 13. Weeds will not be strong enough to rotate an arm 16 and will merely ride around the end of the same and assume a position in rear thereof, so that the arm will then serve as a thrust block or plate which will prevent the weeds being bent over by the knife to be presently described and, consequently, will cause the weeds to be effectually cut and destroyed.

The cooperating finger 13 is pivotally supported upon the side of the yoke or U-bar 10 in a bracket 19 secured upon the yoke or U-bar, and the forward end of the said finger 13 is carried forwardly beyond the said bracket and then turned laterally, as shown at 20. A supporting bar 21 projects laterally from the bracket 19 and may be formed integral with the lower end of said bracket while a keeper bar or strap 22 is secured on the upper side of the said bar 21. A spring 23 extends between and is attached to the outer end of the lateral branch 20 of the finger 13 and to the outer end of the bar 21 or the keeper 22 and tends constantly to hold the finger 13 pressed toward the finger 12. Pivotally mounted between the bar 21 and the keeper 22 so as to be supported thereby are angle levers 24 and 25 which are reversely arranged and have their adjacent arms connected by a link 26. The outer end of the outer angle lever 24 is connected by a link 27 with the outer end of the branch 20 while the inner end of the inner angle lever 25 is connected by a link 28 with the outer end of a knife 29 pivoted upon the rear end portion of the finger 13, as shown clearly in Fig. 3. This knife 29 has one end projecting laterally outward from the finger 13 while its opposite end projects normally across the space between the fingers 12 and 13 and is provided with cutting teeth 30 along its front edge. To limit the forward movement of the outer end of the knife, a locking bar 31 is pivotally mounted on the finger 13 in advance of the knife in such position that the rear end of the bar will abut the front edge of the knife at the outer side of the pivot of the latter. A spring 32, attached to the locking bar and to the finger 13, holds the bar normally in engagement with the knife while a stop 33 limits the movement of the locking bar under the influence of the spring. The front end of the locking bar is extended laterally inward to form a trigger 34 normally lying in the space between the fingers 12 and 13 to be actuated by the corn stalks.

The device having been mounted upon the cultivator frame as described and as shown in Fig. 1, the machine is drawn along the row of corn and will automatically adapt itself to any departures of the stalks from a straight line inasmuch as the yoke or U bar 10 which carries the fingers is pivotally mounted upon the holding bar 5. The stalks of corn will be strong enough to push the finger 13 to one side and when the said finger is pushed to one side it moves pivotally upon the bracket 19 so that its lateral forward branch 20 works against the tension of the spring 23 and exerts a forward pull upon the outwardly extending arm of the angle lever 24. The angle lever is thus rocked about its fulcrum or pivot and will pull through the link 26 upon the angle lever 25 so that the inner arm of said lever will pull forwardly upon the link 28 and, consequently, swing the knife 29 about its pivotal mounting to turn the working end of the knife rearwardly. The stalks may, consequently, pass through between the fingers without being acted upon by the knife, it being understood that the impact of a stalk upon the trigger 34 will swing the same pivotally to release the knife so that the latter will be free to swing out of the way of the stalk. When the fingers, however, encounter weeds between the corn stalks, the separation of the fingers 12 and 13 will not occur inasmuch as the weeds will not have strength enough to swing the finger 13 against the tension of the spring 23. The knife 29 will, consequently, remain in the position shown in Figs. 2 and 3 and will impinge against the weeds which will be prevented from bending under the knife by an arm 16 and, consequently, the knife will cut through the weeds so that they will be destroyed.

The form of the invention shown in Figs. 1, 2 and 3 and just described is intended more particularly for use in cultivating crops which have reached some height. For smaller crops in which the corn stalks have not attained strength sufficient to actuate the trigger and the arms 16, I provide the form of the invention illustrated in Fig. 4. In this embodiment, supporting arms 35 are secured to the ends of the yoke or U bar 10 and project rearwardly therefrom, the rear extremities of these arms being turned outwardly, as shown at 36, to provide members upon which the fingers 37 may be fulcrumed. The fingers 37 converge rearwardly just as the fingers 12 and 13 converge rearwardly but they do not carry elements corresponding to the trigger, the knife 29, and the abutment arms 16. Upon the outer sides of the fingers 37 near the rear extremities thereof, I rigidly secure the arcuate knives 38 which resemble forwardly projecting hooks and are adapted to engage and cut down vines which tend to climb the corn stalks. The front ends of the fingers 37 project forwardly from their pivots 39, as shown at 40, and through the front extremities of these end portions 40 stay bolts 41 project from the supporting arms 35. Springs 42 are mounted between the arms 35 and the ends 40 of the fingers and are supported by the stay bolts 41, the springs tending constantly to hold the rear ends of the fingers 37 toward each other. Wing nuts 43 are mounted upon the ends of the stay bolts and are turned home against the ends 40 of the fingers 37 to regulate the tension of the springs and thereby control the intensity with which the fingers 37 will remain in their normal positions. In this form of the invention, the stalks will push the fingers aside so that no damage will be inflicted upon the stalks but any vines which may be growing at the sides of the stalks and which would tend to climb the stalks as the crop develops will be engaged by the hook-like knives 38 and will be cut through so that they will be destroyed. Of course, the form of the invention illustrated in Fig. 4 and just described may be used alternately with the first described form if the conditions of the crop should be such that vines growing adjacent the corn stalks and tending to climb the same should not be acted upon by the knife 29. In both forms of the invention, I have provided plant-engaging members which will automatically shift to the right or the left accordingly as the corn stalks may be at one or the other side of a true line longitudinally of the row and the fingers will be automatically separated by the corn stalks to permit the stalks to pass and automatically return to normal position after the corn stalk has been cleared so that any weeds growing in the row will be engaged and destroyed. The device is exceedingly simple and may be applied to any cultivator and operates in a highly efficient manner for the purpose for which it is designed.

To limit the closing movement of the finger 13, a stop arm 50 may be secured upon the bar 21 and project forwardly in the path of the branch 20, as shown in Fig. 2.

Having thus described the invention, I claim:

1. An attachment for cultivators comprising a holding bar, means for securing said bar to a cultivator, a yoke pivotally mounted upon the said bar, a stop on the yoke to impinge against the bar and limit the pivotal movement of the yoke, rearwardly converging fingers carried by the yoke, weed-cutting elements carried by the rear ends of the fingers, and yieldable means tending to hold the rear ends of the fingers toward each other.

2. An attachment for cultivators comprising a holding bar, means for pivotally mounting the said bar below the tongue of a cultivator, means for pivotally adjusting the said bar and securing it in a set position, a yoke carried by the rear end of said bar, rearwardly converging fingers carried by the said yoke, yieldable means holding the rear ends of the fingers toward each other, and weed-cutting elements carried by the rear ends of said fingers.

3. An attachment for cultivators comprising a yoke, means for mounting the said yoke upon a cultivator frame, a finger extending rearwardly from one end of said yoke, a co-operating finger pivotally mounted upon the opposite end of the yoke and normally converging rearwardly toward the first-mentioned finger, yieldable means holding the rear end of the pivoted finger toward the rear end of the fixed finger, a weed cutter carried by the rear end of the pivoted finger, and a yieldably mounted abutment carried by the fixed finger, the said abutment yielding to the passage of stalks but engaging in front of the weeds whereby to receive the thrust from the knife.

4. An attachment for cultivators comprising a yoke, means for mounting the yoke upon a cultivator frame, a fixed finger projecting rearwardly from one end of the yoke, an abutment pivoted upon the said finger near the rear end thereof, a cooperating finger pivotally mounted upon the opposite side of the yoke, means yieldably holding the pivoted finger to the fixed finger whereby the pivoted finger may move aside when engaged by a corn stalk, a pivoted weed cutter mounted upon the pivoted finger near the rear end thereof, and connections between the said cutter and the front end of the finger whereby the cutter will be moved aside when the finger is engaged by a corn stalk.

5. An attachment for cultivators comprising a yoke, means for mounting the yoke upon a cultivator frame, a fixed finger projecting rearwardly from one end of the yoke, a finger pivoted upon the opposite end of the yoke and normally converging rearwardly toward the fixed finger, the pivoted finger having a lateral branch in advance of its pivot, a supporting arm extending laterally from the yoke, a yieldable connection between said supporting arm and the lateral branch of the pivoted finger, a knife pivoted on the rear end of the pivoted finger, angle levers mounted upon the said supporting arm, and connections between the angle levers and the knife and between the angle levers and the lateral branch of the pivoted finger whereby when the said finger is pushed aside by a corn stalk the knife will be swung rearwardly upon the finger.

6. An attachment for cultivators comprising a pair of supporting fingers, one of the fingers being movable toward and from the other finger, yieldable means normally holding the fingers toward each other, a series of abutments rotatably mounted upon one finger to project across the space between the fingers, means for preventing movement of the abutments in one direction, a knife pivotally mounted upon the other finger to co-operate with the projected abutment, a locking bar mounted on the last-mentioned finger and engaging the knife to hold it in operative position, a trigger connected with the locking bar and projecting from the finger to be actuated by a corn stalk whereby to release the knife, and means whereby the knife will be moved to inoperative position when the fingers move apart.

In testimony whereof I affix my signature.

PHILANDER BUNDY. [L. S.]